United States Patent Office 3,639,515
Patented Feb. 1, 1972

3,639,515
PREPARATION OF α-OLEFIN BLOCK
COPOLYMERS
Hugh J. Hagemeyer, Jr., and Marvin B. Edwards, Longview, Tex., assignors to Eastman Kodak Company, Rochester, N.Y.
No Drawing. Continuation-in-part of application Ser. No. 28,826, May 13, 1960, which is a continuation-in-part of applications Ser. No. 615,775, Oct. 15, 1956, now Patent No. 3,067,183, and Ser. No. 668,840, July 1, 1957. This application Feb. 6, 1969, Ser. No. 797,246
The portion of the term of the patent subsequent to Oct. 12, 1988, has been disclaimed and dedicated to the Public
Int. Cl. C08f 1/30, 15/00
U.S. Cl. 260—878 B
4 Claims

ABSTRACT OF THE DISCLOSURE

This invention relates to the solution polymerization of α-olefins to form block copolymers. The polymerization is conducted in the presence of a catalyst comprising titanium trichloride and a lithium component.

This application is a continuation-in-part of application Ser. No. 28,826, filed May 13, 1960, which is a continuation-in-part of application Ser. No. 668,840, filed July 1, 1957, now abandoned, and application Ser. No. 615,775, filed Oct. 15, 1956, now U.S. Pat. 3,067,183.

This invention relates to new compositions of matter and methods for their preparation. More particularly, the present invention relates to solid crystalline block copolymers of propylene with other α-olefins which have enhanced properties. In a specific aspect this invention relates to propylene polymers having superior low temperature brittleness properties and a novel two-stage process for their preparation.

It is known that α-olefins such as propylene can be polymerized to relatively high molecular weight solid polymers by subjecting the monomer to relatively mild conditions of temperature and pressure in the presence of ionic catalyst mixtures. The polymerization procedures employing such catalyst mixtures can be carried out at temperatures ranging from below room temperature such as, for example, temperatures of 0° C. to temperatures in the order of 250° C. and higher. These catalysts are also effective at pressures from atmospheric to very high pressures in the order of 30,000 p.s.i. or higher, although only slight superatmospheric pressures are usually required and hence, pressures up to 1,000 p.s.i. are ordinarily employed.

However, as disclosed in U.S. Pat. 2,918,457 which issued on Dec. 22, 1959, crytalline polymers of propylene, i.e., propylene polymers exhibiting crystalline structure by X-ray analysis, possess many desirable properties, but they are not suitable for use in many applications because of their high brittle points. By "brittle point" is meant the temperature at which the polymer exhibits brittle failure under specific impact conditions as measured, for example, by ASTM D747–55T. As pointed out in the aforementioned patent, many of the plasticizers heretofore used with various plastic materials do not appear suitable for improving the brittle point of polypropylene because such materials lower the tensile strength and/or adversely affect other physical properties of the polymer such as the melting point, melt index and the like.

In U.S. 2,918,457 the brittle point of propylene polymers is improved by polymerizing mixtures of propylene and butene-1 to form copolymers in which there is a random distribution of each of the monomers in the polymer chain. One disadvantage of such copolymers is that at least 7% thereof must be butene-1 in order to obtain a product having a brittleness temperature below 0° C. Furthermore, random copolymer comprising propylene and another α-olefin, for example, ethylene, were found to have brittle points in excess of 7° C. as shown at column 4, lines 8–13 of the above-mentioned patent.

It is evident, therefore, that the state of the art will be enhanced by providing a class of propylene polymers having an improved brittle point. Likewise a noteworthy contribution to the art will be a method for the preparation of such compounds.

Accordingly, an object of this invention is to provide new propylene polymers having low brittle points.

Another object is to provide novel copolymers comprising propylene and α-monoolefins which copolymers have low brittle points.

Still another object of this invention is to provide novel copolymers comprising propylene and another α-monoolefin, for example, ethylene, which exhibit brittle points as low as −50° C.

Still another object of this invention is to provide novel propylene copolymers containing as little as 5% of a second α-monoolefinic monomer which copolymers will exhibit brittle points as low as −40° C.

Still another object of this invention is to provide a novel two-stage process for preparing such copolymers.

Other objects will become apparent from an examination of the description and claims which follow.

In accordance with this invention it has been found that solid crystalline block copolymers containing at least 80% by weight, of propylene, with a different α-monoolefin, prepared as described hereinafter, have very low brittle points while still retaining the desirable properties of crystalline polypropylene.

It should be understood that the block copolymers of this invention are quite different from the ordinary type of copolymer prepared heretofore. For example, it is well known that copolymers of various unsaturated compounds can be prepared by the simple expedient of subjecting a mixture of two or more monomers to polymerization conditions as shown in U.S. Pat. 2,918,457, for example. However, this type of process results in a copolymer having a random distribution of each of the monomers in the polymer chain. On the other hand, the copolymers of this invention are block copolymers and exhibit a very definite and precise arrangement of each of the polymer components in the polymer chain. The block copolymers of this invention can be represented as those containing a polymer chain illustrated by the formula

AAAAAAAABB wherein A is the propylene component and B is the comonomer as contrasted to the random copolymers of the prior art which contain polymer chains represented by the formula AABABBA. The precise arrangement in the copolymer makes it possible, by appropriate selection of the type and amounts of each polymer component as well as the polymerization conditions and ratio of the catalyst components, to produce copolymers having a wide variety of properties in addition to the low brittle point. This wide flexibility in properties of the copolymers of this invention is not obtained with most of the prior art copolymers.

Also, in prior art copolymers it has often been found that the product is a blend containing large amounts or mixtures of polymers prepared from each of the monomers. These mixtures are, of course, quite distinct from the copolymers of this invention which contain the polymer components in a single polymeric chain. The prior art products should more aptly be termed poly blends or simply mixtures of polymers. In our invention we find it advantageous to use no more poly-α-monoolefin in our process than can be incorporated in the polypropylene chain, the exact preferred amounts being determinable by the copolymer being produced and the polymerization conditions used. In this manner it is possible to avoid the production of a poly blend instead of a true copolymer.

The block copolymers of this invention can contain varying amounts of each of the polymers in a single polymeric chain. For example, the copolymer can contain from 80 to 99% of polypropylene and from 1 to 20% of a poly-α-monoolefin. The amounts of each of the components can be varied within these ranges to produce a copolymer having specific desirable properties. In general, however, the block copolymers of this invention are characterized by molecular weights of at least 10,000, and preferably within the range of about 15,000 to about 100,000, densities of at least 0.85, with densities within the range of 0.87 to about 0.92 being preferred, and brittle points lower than 0° C.

The novel copolymers of this invention are produced in a two-stage polymerization procedure in which propylene is contacted with a solid stereospecific polymerization catalyst in the first stage and the second monomer is then added to the second stage to produce a block copolymer containing at least 80% propylene and having a brittle point lower than 0° C. This two-stage process can be conducted in a single reactor having separate reaction zones preferably separated by a baffle or other separation means. However, the two separate reactions forming our process can also be conducted in separate reactors arranged in series and alternatively the entire process could be carried out in an elongated tubular reactor. The block copolymers of this invention can also be produced batchwise by carrying out the first portion of the polymerization with propylene and then adding ethylene or a second α-monoolefin after a portion of the propylene, e.g. 20–30%, has been polymerized. The exact amount of monomer fed to the second stage will vary widely depending upon such variables as the reaction conditions employed, the percent of propylene converted to polypropylene in the first stage, the desired molecular weight of the block copolymer and similar variable factors. Consequently, the amount of monomer fed, in a specific situation, will depend upon the correlation of the several variable factors. However, this amount of monomer will be such that the block copolymer contains at least 1 percent, by weight, of the second monomer copolymerized with at least 80 percent by weight of propylene.

The catalysts which are employed in practicing this invention are an important feature of the process and include any of the conventional solid stereospecific catalysts known in the prior art. These catalysts contain at least two components, namely, a transition element halide in combination with an activator therefore. These catalysts include, for example, mixtures containing a halide of a transition element from the 4th to the 6th subgroups of the Periodic Table in combination with a metal of Group I–A or II or aluminum, or with an alloy of metals of Group I–A and/or II and/or aluminum, or with a halide or organometallic compound of a metal of Group I–A or II and/or aluminum, or with a complex hydride or a complex organometallic compound of boron or aluminum and a metal of Group I–A or II of the Periodic Table. The Periodic Table referred to herein can be found in "Lange's Handbook of Chemistry," 8th edition (1952), published by Handbook Publishers, Inc. at pages 56 and 57, for example.

The transition metals included in Groups IV–B—VI–B of the Periodic Table are exemplified by metals such as titanium, zirconium, vanadium, molybdenum, chromium, and the like. The transition metal halide catalyst components can be used at their maximum valence, or if desired, a reduced valency form of the halide can be employed. It is preferred to use the titanium chlorides which can be in the form of titanium tetrachloride, titanium trichloride and titanium dichloride. Examples of other transition metal halides that can be employed in the process of this invention include titanium tetrabromide, titanium tribromide, zirconium tetrachloride, zirconium tetrabromide, vanadium trichloride, molybdenum pentachloride, chromium trichloride, and the like.

Suitable activators which can be employed in conjunction with the transition element halides include, for example, metal alkyls, metal aryls, metal alkyl halides and metal hydrides of aluminum or Groups I–A and II as well as the metals above. The preferred activator is a lithium component as exemplified by lithium metal, lithium alkyl, lithium aluminum hydride, lithium aluminum alkyls, lithium borohydride, lithium dialuminum heptahydride, and the complex reaction products containing lithium such as the product obtained by reacting lithium hydride or lithium alkyl with an aluminum alkyl or alkyl aluminum hydride, or mixtures of these in combination with a Group IV–B to VI–B transition element halide at a valence state of one less than maximum. Third components such as NaF, and MgO may also be used. Such preferred high temperature stereospecific catalysts for the polymerization of propylene and higher alpha-olefins are, for example, lithium aluminum hydride in combination with titanium trichloride, and sodium fluoride; lithium dialuminum heptahydride in combination with titanium trichloride, sodium fluoride and magnesium oxide; and complex lithium containing compounds such as the product obtained by reacting lithium hydride or lithium alkyl with an aluminum alkyl or alkyl aluminum hydride in combination with titanium trichloride.

Suitable Group I–A or II metals include sodium, potassium, lithium, zinc, and the like. The alloys, halides, hydrides, or organometallic compounds of these metals include, for example, sodium amyl, potassium butyl, lithium propyl, zinc dibutyl, zinc diamyl, zinc dipropyl, ethyl magnesium bromide, sodium hydride, calcium hydride, lithium aluminum hydride, and the like. Also, the catalyst composition can contain or organo aluminum compound such as aluminum triethyl, aluminum tributyl, ethyl aluminum dichloride, cyclohexyl aluminum dichloride, cyclobutyl aluminum dichloride, ethyl aluminum dibromide, ethly aluminum sesquichloride, ethyl aluminum sesquibromide, dimethyl aluminum bromide, propyl aluminum dichloride, dibutyl aluminum chloride, diethyl aluminum chloride, and the like. If desired, a third component can be employed in order to increase the stereospecificity of the catalyst and reduce the formation of waxes, oils, and amorphous polymers. Suitable third components include the halides of alkali metals, magnesium oxide, aromatic ethers, hydrides of sodium, potassium, and lithium and alcoholates of sodium, potassium, lithium, calcium, magnesium, barium, strontium, aluminum, titanium, and zirconium. In addition, it is often desirable to employ tertiary amines and tertiary phosphoramides as third components with alkyl aluminum halides.

Catalyst containing a lithium component such as lithium, lithium alkyls, lithium aluminum hydride, lithium hydride and lithium aluminum tetraalkyls in combination with the reduced valency form of the transition elements from the 4th to the 6th group of the Periodic Table are preferred for high temperature solutions or melt polymerization procedures. These catalysts are particularly effective at temperatures above 110° C.

Generally, a mole ratio of activator to metal halide of 0.1:1 to 12:1 is satisfactory in the practice of this invention. Where a third component is employed, the mole ratios of metal halide to third component of 0.25 to 1.0 are generally satisfactory. The concentrations of the catalyst in the reaction medium can be varied over a wide range. For example, catalyst concentrations of 0.1% or less, up to 3% or more can be used.

The temperature of the two-stage polymerization process can be widely varied. However, temperatures ranging from about 0° C. to about 300° C. may generally be employed. With activators other than lithium and lithium compounds it is desirable to use temperatures less than 100° C. In slurry polymerizations at temperatures below 100° C., the inherent viscosities of polymer can be controlled by using hydrogen as a satisfactory chain terminator. In melt or solution polymerization at temperatures above 100° C. the inherent viscosity is controlled by rigid control of the reaction temperature and to a lesser extent by controlling the pressure.

A suitable pressure range for the practice of the process of this invention include pressures from atmospheric to pressures of about 2,000 atmospheres or more. Generally, it is desirable to use pressures in excess of 15 atmospheres in order to obtain satisfactory rates of reaction. Higher pressures, for example, 2 to 500 atmospheres may be required for polymerizations in the absence of a solvent.

The organic vehicle or solvent that can be employed as a reaction medium in the process of this invention included aliphatic alkanes or cycloalkanes such as propane, pentane, hexane, heptane, cyclohexane and the like, or hydrogenated aromatic compounds such as tetrahydronaphthalene or decahydronaphthalene or a high molecular weight liquid paraffin or mixture of paraffins which are liquid at the reaction temperature or an aromatic hydrocarbon such as benzene, toluene, xylene, and the like. The nature of the vehicle or solvent is subject to considerable variation, but the solvent should be in a liquid form at the reaction conditions and relatively inert to the reactants and reaction products. Other solvents which can be used include ethyl benzene, isopropyl benzene, ethyl toluene, n-propyl benzene, the diethyl benzenes, mono and dialkyl naphthalenes, n-pentane, n-octane, isooctane, methyl cyclohexane, Tetralin, Decalin, mineral spirits and any of the other well-known inert hydrocarbons.

The comonomer which can be copolymerized with polypropylene to form the novel block copolymers of this invention include any of the well-known α-monoolefinic hydrocarbons. However, the preferred comonomers include aliphatic α-monoolefins containing 2 to 10 carbon atoms. Suitable α-monoolefinic hydrocarbons which can be employed include, for example, ethylene, butene-1, pentene, hexene, heptene, decene, styrene, and the like.

A surprising feature of this invention involved the discovery that in the formation of propylene-ethylene block copolymers, the polymerization must be initiated with propylene and then terminated with ethylene. When operating in this manner, the resulting block copolymer then contains both propylene and ethylene in the chain, as indicated by infrared analysis. However, when the polymerization is initiated with ethylene and then terminated with propylene, no polymerization of the propylene occurs, and the polymer chain contains only ethylene.

This invention can be further illustrated by the following examples of preferred embodiments thereof although it will be understood that these examples are included merely for purposes of illustration and are not intended to limit the scope of the invention unless otherwise specifically indicated.

EXAMPLE 1

0.60 gram of LiAlH$_4$ (.0158 mole) and 2.46 grams of TiCl$_3$ (.0158 mole) slurried in 900 ml. of mineral spirits were charged to a 2-liter stirred autoclave. The polymerization was carried out as follows:

| Time | Pressure | Temp., °C. |
|---|---|---|
| 3:50 | 800 p.s.i.g. C$_3$H$_6$ | 133 |
| 4:05 | 1,775 | 161 |
| 4:18 | 1,050 | 164 |
| 4:25 | 900 | 159 |
| 4:50 | 600 | --- |
| 4:52 | Pressured to 850 p.s.i.g. with C$_2$H$_4$ | 155 |
| 5:30 | 515 | 154 |
| 7:00 | 185 | 151 |

The autoclave was cooled and the polymer washed free of catalyst with hot isobutanol. Yield was 320 grams of a 95–5 weight percent propylene ethylene block copolymer. The product was characterized by a melt index of 3.67; an inherent viscosity at 145° C. in Tetralin 1.36; a Vicat softening point of 131° C.; and a brittleness temperature of −50° C. This compares with a brittleness temperature of >20° C. for 100 percent polypropylene.

EXAMPLE 2

0.75 gram of LiAlH$_4$ (0.2 mole) and 3.06 grams of TiCl$_3$ (.02 mole) in 900 ml. of mineral spirits were charged to a 2-liter stirred autoclave. The polymerization was carried out as follows:

| Time | Pressure | Temp., °C. |
|---|---|---|
| 2:45 | 800 p.s.i.g. C$_3$H$_6$ | 132 |
| 2:55 | 1,700 | 150 |
| 3:35 | 550 | --- |
|  | Pressured to 800 p.s.i.g. with Butene-1 | 167 |
| 3:45 | 500 | 170 |
| 4:10 | 410 | 165 |
| 4:30 | 375 | 160 |

The autoclave was discharged through a filter. The yield was 400 grams of a 96–4 weight percent propylene-butene-1 polymer with a brittleness temperature of −35° C.

EXAMPLE 3

Propylene-ethylene polymers were produced by polymerization in a continuous two-stage reactor system. In the first stirred tubular reactor, the feed was liquid propylene and the catalyst was a 2/1/3 mole ratio of ethyl aluminum sesquichloride, hexamethyl phosphoramide and titanium trichloride. The catalyst suspended in xylene was fed to the liquid propylene and the polymerization was carried out at 80° C. and 770 p.s.i.g. using 100 p.p.m. H$_2$ to control inherent viscosity. Conversion in the first stage averaged 25–30 percent at a catalyst concentration of 0.2 percent.

The polypropylene-catalyst slurry from the first stage was fed to the second stage tubular reactor and 4 weight percent ethylene was added and the polymerization continued at 80° C. and 860 p.s.i.g.

From the second stage the polymer slurry in liquid propylene was let down to a solids-gas separator. The olefin was flashed off and sent to a separation unit. The polymer was dropped to a wash tank and the catalyst removal was effected with hot isobutanol washing.

Polymer yield per unit of catalyst was 250 and the polymer contained propylene and ethylene in a 97–3 weight ratio. The inherent viscosity was 2.25 and the brittleness temperature was −28° C.

EXAMPLE 4

Five additional runs were made resulting in three different block copolymers of propylene. The procedural aspects together with the results of these runs are set forth in the following table.

The results of 4 runs using the procedure described hereinabove are set forth in the following table.

TABLE 2

| Run No. | 1 | 2 | 3 | 4 |
|---|---|---|---|---|
| Propylene feed to first zone, lbs./hr | 10,800 | 12,100 | 8,900 | 7,300 |
| 3.2 Li, 0.17 LiAlH$_4$, 14.3 TiCl$_3$ cat feed, lbs./hr | 0.23 | 0.46 | 0.31 | 0.41 |
| Reactor pressure, atms | 1,270 | 1,300 | 1,250 | 1,500 |
| Reactor temperatures, °C.: | | | | |
| First zone top | 170 | 167 | 174 | 178 |
| First zone bottom | 190 | 193 | 191 | 193 |
| Second zone top | 190 | 192 | 196 | 199 |
| Second zone bottom | 186 | 190 | 199 | 206 |
| Ethylene feed to second zone, lbs./hr | 230 | 380 | 360 | 310 |
| Production rate, lbs./hr | 3,360 | 4,020 | 2,170 | 2,420 |
| Inherent viscosity (tetralin, 145° C.) | 2.57 | 2.31 | 2.42 | 2.68 |
| Percent ethylene in polymer | 2.1 | 3.9 | 7.0 | 9.0 |
| Brittleness temperature, °C. | −25 | −41 | <−60 | <−60 |

TABLE 1

| Catalyst components | Mole ratio of components | Polymerization conditions | | | Comonomer fed to 2d stage | Weight percent comonomer in polymer | Brittleness temp., °C |
|---|---|---|---|---|---|---|---|
| | | Solvent | Temp., °C. | Pressure, p.s.i.g. | | | |
| Li, TiCl$_3$, Diphenyl ether | 5/1/1 | Cyclohexane | 160 | 1,000 | Ethylene | 5 | −50 |
| Et$_3$Al$_2$Cl$_3$, TiCl$_3$, MgO | 1/1/1 | Mineral spirits | 80 | 700 | do | 3 | −26 |
| Et$_3$Al, VCl$_3$, NaF | 2/1/1 | Liq. C$_3$H$_6$ | 85 | 770 | Butene-1 | 7 | −15 |
| Et$_3$Al, TiCl$_3$, Al(OPr)$_3$ | 2/1/0.5 | Cyclohexane | 85 | 400 | Hexene-1 | 2 | −22 |
| LiAlH$_4$, TiCl$_3$, LiH | 0.1/1/4.9 | Mineral spirits | 160 | 1,200 | Ethylene | 10 | −53 |

EXAMPLE 5

As previously indicated, propylene-ethylene polymers with superior low temperature properties are produced by carrying out the polymerization in a 2-zone stirred reactor at elevated pressures and temperatures. To illustrate this feature of the invention, an elongated reactor 14 feet long and 20 inches internal diameter separated into two distinct reaction zones by a centrally located baffle and having a stirring mechanism extending through the two reaction zones was used in the following runs. In the top zone the agitator shaft that extends through the center of the reactor is provided with a single 4-bladed paddle type agitator at the top of the zone. This type of agitator arrangement is used to obtain the maximum amount of reaction in the first zone with a minimum amount of catalyst. In the second or lower zone mixing paddles are placed substantially along the entire length of the agitator shaft to give a plug flow with a minimum of back mixing from the second to the first zone.

Propylene is compressed to 1250 to 1500 atmospheres and fed into the top zone at rates varying from 8,600 to 14,100 pounds per hour. A catalyst comprising 3.2 parts by weight of lithium metal dispersion, 0.17 part by weight lithium aluminum hydride and 14.3 parts by weight of titanium trichloride slurried in cyclohexane was fed at rates varying from 0.2 to 0.45 pound per hour. The temperature in the first zone is controlled by external cooling and by controlling the rate of feed and temperature of the incoming propylene. Conversions in the first zone are generally controlled at 20–40 percent by controlling the propylene feed rate and the catalyst concentration employed.

In the second zone ethylene is fed to give propylene-ethylene block copolymers with superior low temperature brittleness values. Feed rates for ethylene varying from 100 to 1000 pounds per hour are typical of those employed to give the superior block copolymers of this invention.

EXAMPLE 6

Aluminum triethyl (5.0 ml.) and titanium tetrachloride (2.4 ml.) were added to 500 ml. of heptane contained in a 1-liter 3-neck flask under a nitrogen atmosphere. The flask was fitted with a gas inlet tube which reached to the bottom of the flask, a mechanical stirrer, and a brine-cooled reflux condenser. A gas outlet tube led from the top of the condenser through a mercury bubbler and finally to an ice trap maintained at −10 to −20° C. The mercury bubbler served to exclude air from the reaction vessel and the ice trap was used to determine the amount of solvent swept through the condenser with effluent monomer gas.

The catalyst mixture was stirred and propylene was introduced through the inlet tube at such a rate that little escape through the mercury bubbler. After two hours, 29 grams of propylene had been absorbed. The introduction of propylene was stopped and ethylene was introduced for 2 hours. Cooling was necessary during this stage to keep the reaction temperature at or below 60° C.

Methanol (200 ml.) was added to decompose the catalyst and the solid ethylene-propylene block copolymer was recovered by filtration. The solid was washed free of catalyst with hot methanolic hydrochloric acid and methanol.

The ethylene-propylene block copolymer (mole ratio 2.2/0.7) weighed 80 g. and melted at 139–154° C. Properties of the polymer were: melt index, 0.028; high pressure melt index, 0.44; density, 0.937; tensile strength at fracture, 2455 p.s.i., at upper yield, 2175 p.s.i.; percent elongation, 575; stiffness in flexure, 38,600 p.s.i.; Vicat softening point, 118.2° C. and a brittle point of <−70° C.

EXAMPLE 7

A mixture of 500 ml. of heptane, 10.0 ml. of ethyl aluminum sesquibromide and 10.0 ml. of titanium tetrachloride was prepared in a 1-liter 3-neck flask. The flask was fitted for propylene polymerization as described in Example 6. The catalyst mixture was prepared in a nitrogen atmosphere as in Example 6.

The reaction mixture was stirred and propylene was introduced beneath the surface of the liquid. The mixture warmed spontaneously to 50–60° and the rate of propylene flow was adjusted so that the temperature of the reaction mixture remained between 50 and 60°. After 4 hours the weight of propylene absorbed was 28 grams.

Introduction of propylene was stopped and ethylene was introduced for three hours. Occasional cooling was necessary to keep the temperature of the reaction mixture between 50 and 60° C.

The crude propylene-ethylene block copolymer was recovered by filtration and washed free of catalyst with methanolic hydrochloric acid and methanol. The propylene-ethylene polymer thus obtained weighed 66 grams and melted at 132–145°. Properties of the polymer were: high pressure melt index, 2.86; specific gravity, 0.991; tensile strength at fracture, 2280 p.s.i.; Vicat softening point, 105.4° C. and a brittle point of $<-70°$ C.

Thus, by the practice of this invention there is provided novel propylene block copolymers which retain the desirable properties of crystalline polypropylene while at the same time being characterized by excellent low temperature brittle points. The block copolymers can, of course, be used as substitutes for polypropylene in applications where this low brittle point is of significance. Such applications would include their use as wrapping materials, fluid containers, fluid conduits or like articles.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A solution polymerization process for preparing block copolymers containing at least 80% by weight propylene from ethylene and propylene monomers which comprises first polymerizing propylene and subsequently a mixture of propylene and ethylene in the presence of from about 0.1 to about 3.0% concentration of catalyst in the reaction medium of a catalyst comprising titanium trichloride and a lithium component at a temperature of at least 133° C., the mole ratio of lithium component to titanium trichloride being 0.1:1 to 12:1.

2. A process according to claim 1 wherein said lithium component is the complex reaction product prepared by reacting aluminum alkyl with lithium hydride.

3. A process for preparing block copolymers according to claim 1 wherein said lithium component is lithium aluminum hydride.

4. A process according to claim 3 wherein said lithium component is the complex reaction product prepared by reacting aluminum alkyl with lithium alkyl.

References Cited
UNITED STATES PATENTS 3,200,173   8/1965   Schilling _____ 260—878

JOSEPH L. SCHOFER, Primary Examiner

S. M. LEVIN, Assistant Examiner

U.S. Cl. X.R.

260—88.2 R, 93.7